United States Patent
Xu et al.

(10) Patent No.: US 12,457,618 B2
(45) Date of Patent: Oct. 28, 2025

(54) RESOURCE BLOCK SET ALLOCATION FOR DYNAMIC UPLINK COMMUNICATIONS IN NEW RADIO-UNLICENSED (NR-U)

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 17/995,421

(22) PCT Filed: Apr. 23, 2020

(86) PCT No.: PCT/CN2020/086367
§ 371 (c)(1),
(2) Date: Oct. 4, 2022

(87) PCT Pub. No.: WO2021/212403
PCT Pub. Date: Oct. 28, 2021

(65) Prior Publication Data
US 2023/0209560 A1   Jun. 29, 2023

(30) Foreign Application Priority Data

Apr. 21, 2020  (WO) ................ PCT/CN2020/085942

(51) Int. Cl.
*H04W 72/23*   (2023.01)
*H04W 72/0453*   (2023.01)

(52) U.S. Cl.
CPC ....... *H04W 72/23* (2023.01); *H04W 72/0453* (2013.01)

(58) Field of Classification Search
CPC ........................................................ H04W 74/12
(Continued)

(56) References Cited

U.S. PATENT DOCUMENTS

| 2013/0114419 A1 | 5/2013 | Chen et al. |
| 2019/0274032 A1 | 9/2019 | Chatterjee et al. |

FOREIGN PATENT DOCUMENTS

| CN | 103548409 A | 1/2014 |
| CN | 110945817 A | 3/2020 |

(Continued)

OTHER PUBLICATIONS

Ericsson: "UL Signals and Channels," 3GPP TSG-RAN WG1 Meeting #100bis-e, Tdoc R1-2002030, Apr. 20-Apr. 30, 2020, Apr. 11, 2020 (Apr. 11, 2020), section 2, pp. 1-15.

(Continued)

*Primary Examiner* — Angel T Brockman
(74) *Attorney, Agent, or Firm* — Harrity & Harrity

(57) ABSTRACT

Wireless communications systems and methods related to resource block set allocation for dynamic uplink communications in a wireless communication network are provided. For example, a method of wireless communication performed by a user equipment can include: monitoring, in a search space of a shared radio frequency band, for downlink control information (DCI); receiving, from a base station based on the monitoring, the DCI, wherein the DCI includes an explicit interlace allocation but does not include an explicit resource block set allocation; determining, based on the received DCI, one or more resource block sets for transmitting an uplink communication; and transmitting, to the base station, the uplink communication using the one or more resource block sets and the explicit interlace allocation.

35 Claims, 13 Drawing Sheets

(58) Field of Classification Search
USPC ........................................................ 370/329
See application file for complete search history.

(56) References Cited

FOREIGN PATENT DOCUMENTS

| | | |
|---|---|---|
| WO | 2013066100 A1 | 5/2013 |
| WO | 2020067815 A1 | 4/2020 |

OTHER PUBLICATIONS

Ericsson: "UL Signals and Channels," 3GPP TSG-RAN WG1 Meeting #100-e, Tdoc R1-2000825, Feb. 24-Mar. 6, 2020 (Mar. 6, 2020) sections 2-3, 10 pages.
International Search Report and Written Opinion—PCT/CN2020/086367—ISA/EPO—Jan. 20, 2021.
International Search Report and Written Opinion—PCT/CN2020/085942—ISA/EPO—Jan. 21, 2021.
OPPO: "Discussion on the Remaining Issues of UL Signals and Channels," 3GPP TSG RAN WG1 #100bis-E, R1-2001758, Apr. 20, 2020-May 1, 2020, Apr. 10, 2020 (Apr. 10, 2020) section 2, 7 pages.
SHARP: "Remaining Issues on UL signals/channels for NR-U," 3GPP TSG RAN WG1 #100bis, R1-2002382, Apr. 20-30, 2020, Apr. 11, 2020 (Apr. 11, 2020), pp. 2-3, 10-11, pp. 1-14.
Supplementary European Search Report—EP20932769—Search Authority—The Hague—Apr. 10, 2024.

RESOURCE BLOCK SET ALLOCATION FOR DYNAMIC UPLINK COMMUNICATIONS IN NEW RADIO-UNLICENSED (NR-U)

CROSS-REFERENCE TO RELATED APPLICATIONS

The present application is a 35 U.S.C. 371 National Phase entry of Patent Cooperation Treaty (PCT) Application No. PCT/CN2020/086367, filed Apr. 23, 2020, which claims priority to PCT Application No. PCT/CN2020/085942, filed Apr. 21, 2020. The aforementioned applications are hereby expressly incorporated herein by reference in their entireties.

TECHNICAL FIELD

This application relates to wireless communication systems, and more particularly to resource block set allocation for dynamic uplink communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

For scheduling physical uplink shared channel (PUSCH) communications, some downlink control information (DCI) formats (e.g., DCI format 0_1) include an interlace allocation (e.g., x bits) and resource block set allocation (e.g., y bits). Accordingly, the UE can use the allocated interlace and resource block set(s) for the uplink data communication. However, some DCI formats (e.g., DCI format 0_0) may include an interlace allocation (e.g., x bits), but not include a resource block set allocation. As a result, there is a need to provide resource block set allocations for uplink communications when an explicit resource block set allocation is not included in the DCI.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some DCI formats (e.g., DCI format 0_0) may include an interlace allocation (e.g., x bits), but not include a resource block set allocation for physical uplink shared channel (PUSCH) communications. Aspects of the present disclosure provide solutions to this problem. For example, aspects of the present disclosure provide resource block set allocations for uplink communications when an explicit resource block set allocation is not included in the DCI.

In some instances, a UE determines one or more resource block sets for transmitting an uplink communication based on a starting or first resource element group of the DCI, an ending or last resource element group of the DCI, all of the resource element groups of the DCI, a subset of the resource element groups of the DCI, and/or combinations thereof. For example, in some instances the UE determines a resource block set for transmitting the uplink communication based on the resource block set in which the starting or first resource element group of the DCI is received. Similarly, in some instances the UE determines a resource block set for transmitting the uplink communication based on the resource block set in which the ending or last resource element group of the DCI is received. Further, in some instances, the UE determines one or more resource block sets for the uplink communication based on the resource block set(s) in which resource element group(s) of the DCI are received, which may be determined in some instances based on the resource block set(s) in which the starting and ending resource element groups of the DCI are received (including any intervening resource block set(s)).

The approaches of the present disclosure can allow a BS to allocate one or more resource block sets to a UE for uplink communication(s) by transmitting the DCI over particular resource block set(s). For example, in some instances the BS may transmit the DCI over multiple resource block sets to allow a UE to transmit the uplink communication(s) over the multiple resource block sets, providing the UE with increased uplink bandwidth and/or redundancy compared with allocating a single resource block set. Further, a BS may allocate different resource block sets to different UEs based on the frequency resources used to transmit the DCIs in order to improve the spectral efficiency of the network and/or to limit potential interference between the uplink communications of the different UEs. In addition, aspects of the present disclosure provide increased flexibility and efficiency over approaches that attempt use a default resource block set(s) (e.g., 0 or all sets).

In an aspect of the disclosure, a method of wireless communication performed by a user equipment includes monitoring, in a search space of a shared radio frequency band, for downlink control information (DCI); receiving, from a base station based on the monitoring, the DCI, wherein the DCI includes an explicit interlace allocation but does not include an explicit resource block set allocation; determining, based on the received DCI, one or more resource block sets for transmitting an uplink communication; and transmitting, to the base station, the uplink communication using the one or more resource block sets and the explicit interlace allocation.

In an additional aspect of the disclosure, a method of wireless communication performed by a base station includes transmitting, to a user equipment in a search space, downlink control information (DCI), wherein the DCI includes an explicit interlace allocation but does not include an explicit resource block set allocation; and receiving, from the user equipment, an uplink communication over one or more resource block sets based on the DCI.

In an additional aspect of the disclosure, a user equipment includes a transceiver; and a processor in communication with the transceiver such that the transceiver and the processor are configured to: monitor, in a search space of a shared radio frequency band, for downlink control information (DCI); receive, from a base station based on the monitoring, the DCI, wherein the DCI includes an explicit interlace allocation but does not include an explicit resource block set allocation; determine, based on the received DCI, one or more resource block sets for transmitting an uplink communication; and transmit, to the base station, the uplink communication using the one or more resource block sets and the explicit interlace allocation.

In an additional aspect of the disclosure, a base station includes a transceiver configured to: transmit, to a user equipment in a search space, downlink control information (DCI), wherein the DCI includes an explicit interlace allocation but does not include an explicit resource block set allocation; and receive, from the user equipment, an uplink communication over one or more resource block sets based on the DCI.

In an additional aspect of the disclosure, a user equipment includes means for monitoring, in a search space of a shared radio frequency band, for downlink control information (DCI); means for receiving, from a base station based on the monitoring, the DCI, wherein the DCI includes an explicit interlace allocation but does not include an explicit resource block set allocation; means for determining, based on the received DCI, one or more resource block sets for transmitting an uplink communication; and means for transmitting, to the base station, the uplink communication using the one or more resource block sets and the explicit interlace allocation.

In an additional aspect of the disclosure, a base station includes means for transmitting, to a user equipment in a search space, downlink control information (DCI), wherein the DCI includes an explicit interlace allocation but does not include an explicit resource block set allocation; and means for receiving, from the user equipment, an uplink communication over one or more resource block sets based on the DCI.

In an additional aspect of the disclosure, a non-transitory computer-readable medium having program code recorded thereon, the program code including code for causing a base station (BS) to transmit system information including a frame based equipment (FBE) configuration indicating a plurality of frame periods, each frame period of the plurality of frame periods including a gap period at a beginning of the frame period; and code for causing the BS to communicate, with a UE, a communication based on the FBE configuration.

In an additional aspect of the disclosure, a non-transitory computer-readable medium having program code recorded thereon for wireless communication by a user equipment includes code for causing the user equipment to monitor, in a search space of a shared radio frequency band, for downlink control information (DCI); code for causing the user equipment to receive, from a base station based on the monitoring, the DCI, wherein the DCI includes an explicit interlace allocation but does not include an explicit resource block set allocation; code for causing the user equipment to determine, based on the received DCI, one or more resource block sets for transmitting an uplink communication; and code for causing the user equipment to transmit, to the base station, the uplink communication using the one or more resource block sets and the explicit interlace allocation.

In an additional aspect of the disclosure, non-transitory computer-readable medium having program code recorded thereon for wireless communication by a base station includes code for causing the base station to transmit, to a user equipment in a search space, downlink control information (DCI), wherein the DCI includes an explicit interlace allocation but does not include an explicit resource block set allocation; and code for causing the base station to receive, from the user equipment, an uplink communication over one or more resource block sets based on the DCI.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
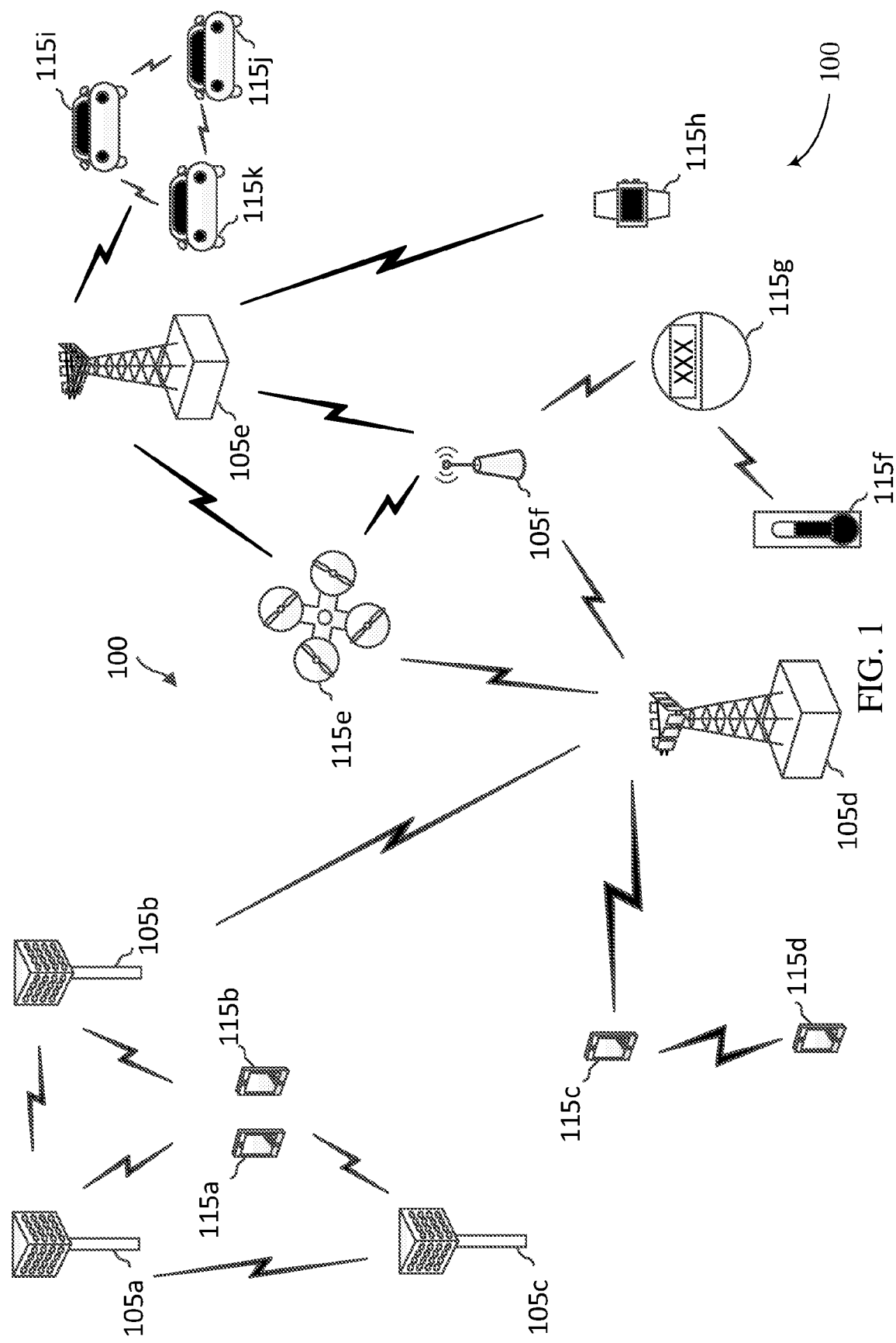
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

For scheduling physical uplink shared channel (PUSCH) communications, some downlink control information (DCI) formats (e.g., DCI format 0_1) include an interlace allocation (e.g., x bits) and resource block set allocation (e.g., y bits). Accordingly, the UE can use the allocated interlace and resource block set(s) for the uplink data communication. However, some DCI formats (e.g., DCI format 0_0) may include an interlace allocation (e.g., x bits), but not include a resource block set allocation for physical uplink shared channel (PUSCH) communications. Aspects of the present disclosure provide solutions to this problem. For example, aspects of the present disclosure provide resource block set allocations for uplink communications when an explicit resource block set allocation is not included in the DCI.

In some instances, a UE determines one or more resource block sets for transmitting an uplink communication based on a starting or first resource element group of the DCI, an ending or last resource element group of the DCI, all of the resource element groups of the DCI, a subset of the resource element groups of the DCI, and/or combinations thereof. For example, in some instances the UE determines a resource block set for transmitting the uplink communication based on the resource block set in which the starting or first resource element group of the DCI is received. Similarly, in some instances the UE determines a resource block set for transmitting the uplink communication based on the resource block set in which the ending or last resource element group of the DCI is received. Further, in some instances, the UE determines one or more resource block sets for the uplink communication based on the resource block set(s) in which resource element group(s) of the DCI are received, which may be determined in some instances based on the resource block set(s) in which the starting and ending resource element groups of the DCI are received (including any intervening resource block set(s)).

In addition to providing an indication of a resource block set allocation for uplink communication(s) when an explicit resource block set allocation is not available in a DCI format, the approaches of the present disclosure can allow a BS to allocate one or more resource block sets to a UE for the uplink communication(s) by transmitting the DCI over particular resource block set(s). For example, in some instances the BS may transmit the DCI over multiple resource block sets to allow a UE to transmit the uplink communication(s) over the multiple resource block sets, providing the UE with increased uplink bandwidth and/or redundancy compared with allocating a single resource block set. Further, a BS may allocate different resource block sets to different UEs based on the frequency resources used to transmit the DCIs in order to improve the spectral efficiency of the network and/or to limit potential interference between the uplink communications of the different UEs. In addition, aspects of the present disclosure provide increased flexibility and efficiency over approaches that attempt use a default resource block set(s) (e.g., 0 or all sets).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

Figure 2:
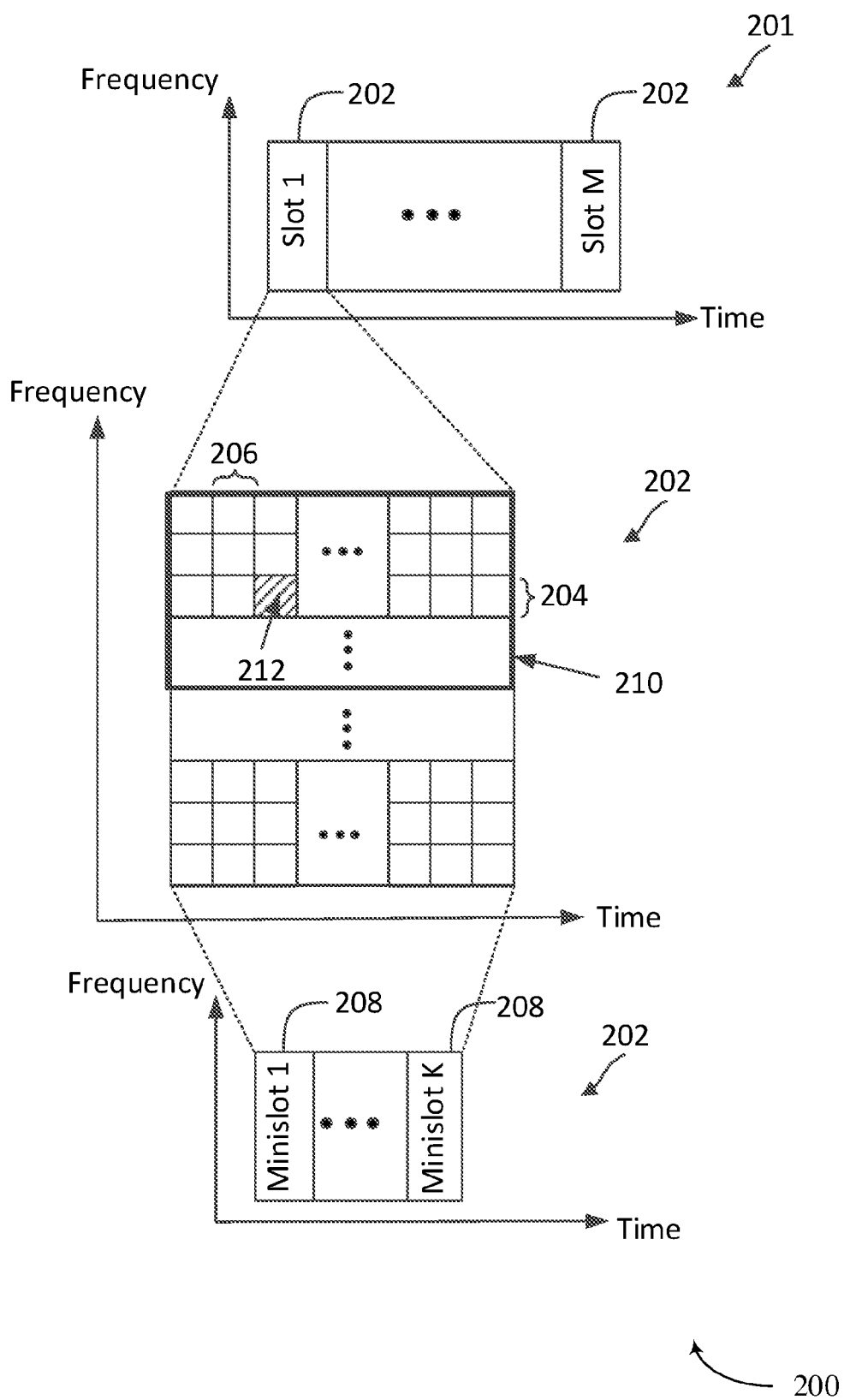
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
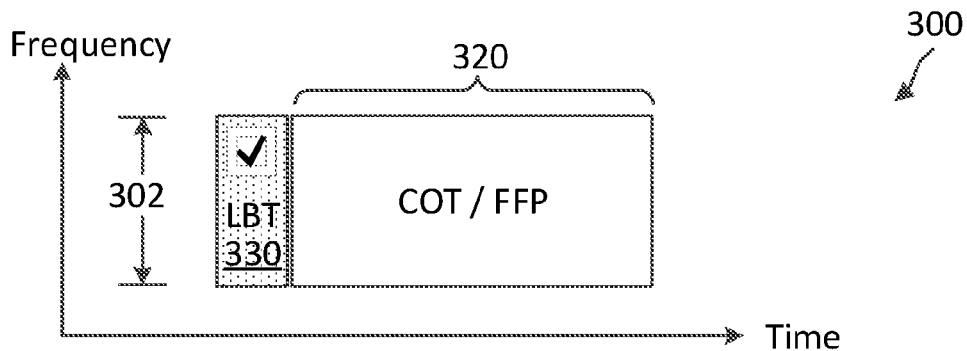
FIG. 3A illustrates aspects of shared radio frequency band communications according to some aspects of the present disclosure.
Figure 3B:
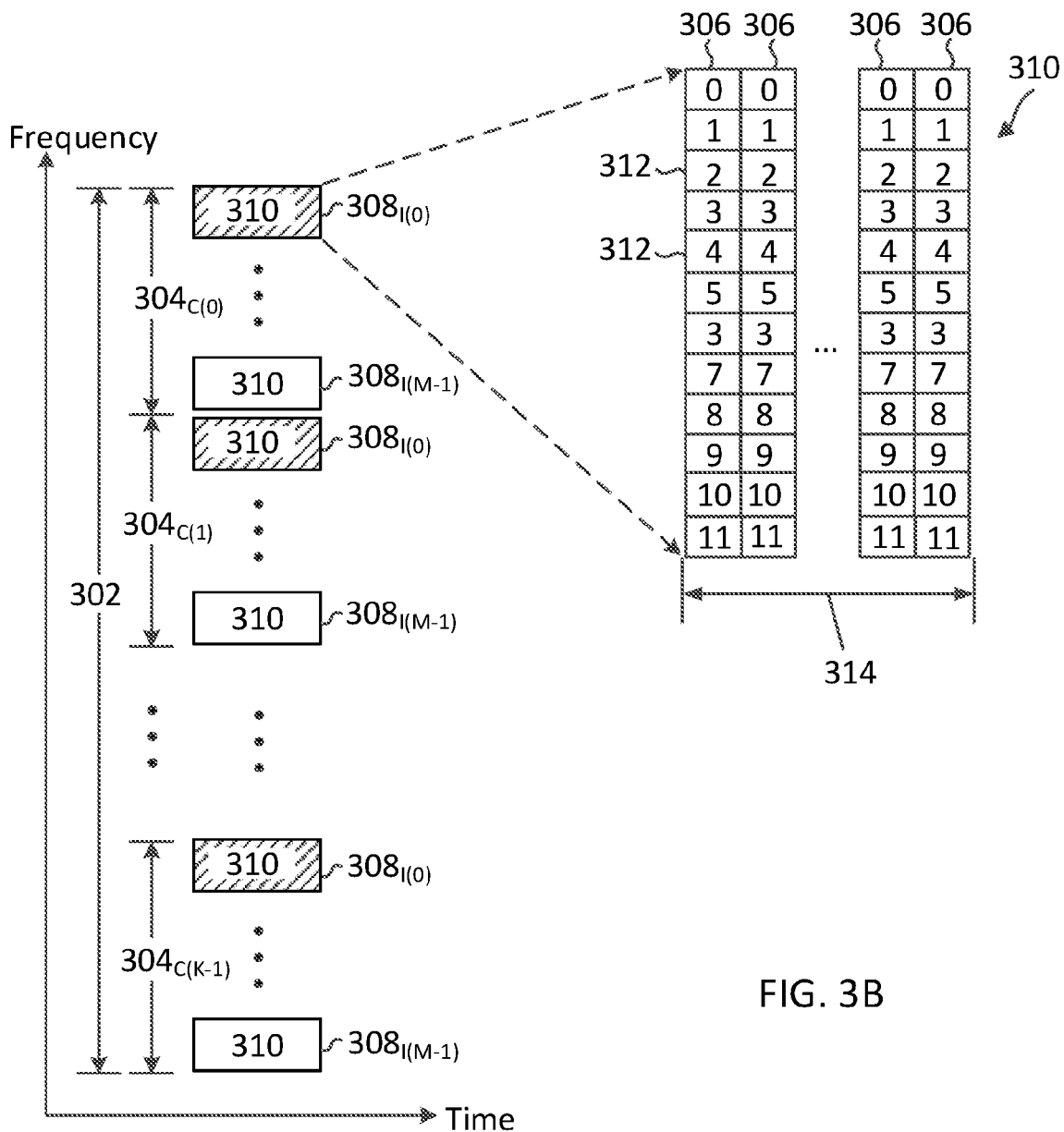
FIG. 3B illustrates aspects of an interlace allocation scheme according to some aspects of the present disclosure.

FIGS. 3A-3B collectively illustrate aspects of shared radio frequency band communications according to some aspects of the present disclosure. FIG. 3A illustrates a communication scheme 300 according to some aspects of the present disclosure. The scheme 300 may be employed by BSs (such as BSs 105) and/or UEs (such as UEs 115) in a network (such as the network 100). In FIGS. 3A and 3B, the x-axes represent time in some arbitrary units, and the y-axes represent frequency in some arbitrary units. In the scheme 300, a BS and/or a UE may contend for a channel occupancy time (COT) and/or a fixed frame period (FFP) (e.g., in a frame based equipment (FBE) mode) in a shared radio frequency band or an unlicensed band (e.g., new radio unlicensed (NR-U). In some instances, a BS that wins contention for the COT and/or FFP allocates resources to a UE for an uplink communication. In some instances, the BS allocates a frequency interlace and/or resource block set(s) to the UE for the uplink communication. The UE, in turn, may transmit the uplink communication using a frequency interlaced waveform over the resource block set(s) allocated to it.

FIG. 3A shows a shared radio frequency band 302. The frequency band 302 may be a shared radio frequency band or an unlicensed band shared by a plurality of network operating entities. The frequency band 302 may, for example, have a BW of about 10 megahertz (MHz) or about 20 MHz and a subcarrier spacing (SCS) of about 15 kilohertz (kHz), about 30 kHz, or about 20 kHz. The frequency band 302 may be located at any suitable frequencies. In some aspects, the frequency band 302 may be located at about 3.5 GHz, 6 GHz, or 30 GHz. To communicate over the frequency band 302, the BS and/or UE may perform an LBT 330 to contend for the COT/FFP 320 in the frequency band 302. The LBT 330 may be a category 4 (CAT4) LBT. A CAT4 LBT refers to an LBT with a random backoff and a variable contention window. If the LBT 330 fails, the BS and/or UE may refrain from transmitting in the frequency band 302. However, if the LBT 330 is successful, the BS and/or UE may proceed to use the COT/FFP 320. In the illustrated example of FIG. 3A, the LBT 330 is successful as shown by the checkmark. Thus, in some instances the BS may allocate resources for a UE to transmit an uplink communication to the BS during the COT/FFP 320.

In some instances, the BS transmits downlink control information (DCI) to the UE indicating the allocated resources. Some downlink control information (DCI) formats (e.g., DCI format 0_1) include an interlace allocation (e.g., x bits) and resource block set allocation (e.g., y bits). Accordingly, the UE can use the allocated interlace and resource block set(s) for the uplink data communication. However, some DCI formats (e.g., DCI format 0_0) may include an interlace allocation (e.g., x bits), but not include a resource block set allocation for physical uplink shared channel (PUSCH) communications. To meet a BW occupancy requirement and/or a PSD requirement in the frequency band 302, the UE may transmit the uplink communication using a frequency interlaced waveform (as shown in FIG. 3B) based on the allocated frequency interlace.

FIG. 3B provides a more detailed view of the resource structure in the COT/FFP 320. As show, the frequency band 302 is partitioned into a plurality of frequency interlaces 308 shown as $308_{I(0)}$ to $308_{(M-1)}$, where M is a positive integer. Each frequency interlace $308_{I(i)}$ may include K plurality of RBs 310 evenly spaced over the frequency band 302, where K is a positive integer and i may vary between 0 to M−1. In other words, the RBs 310 in a particular frequency interlace $308_{I(i)}$ are spaced apart from each other by at least one other RB 310. The frequency interlace $308_{I(0)}$ as shown by the pattern filled boxes comprises RBs 310 from clusters $304_{C(0)}$ to $304_{C(K-1)}$. The values of K and M may vary based on several factors, such as the bandwidth, the SCS, and/or the PSD limitation of the frequency band 302, as described in greater detail below.

A group of M localized RBs 310 forms a cluster 304. As shown, the frequency interlaces $308_{I(0)}$ to $308_{(M-1)}$ form K clusters $304_{C(0)}$ to $304_{C(K-1)}$. Each RB 310 may span about twelve contiguous subcarriers 312 in frequency and a time period 314. The subcarriers 312 can be indexed from 0 to 11. The subcarriers 312 can also be referred to as resource elements (REs). The time period 314 may span any suitable number of OFDM symbols 306. In some aspects, the time period 314 may correspond to one transmission time interval (TTI), which may include about fourteen OFDM symbols 306.

The number of clusters 304 or the value of K may be dependent on the amount of frequency distribution required to maintain a certain BW occupancy. As an example, the scheme 300 may divide the frequency band 302 into about ten clusters 304 (e.g., K=10) and distribute an allocation over the ten clusters 304 to increase a frequency occupancy of the allocation. In an aspect, the frequency band 302 may have a bandwidth of about 20 MHz and each subcarrier 312 may span about 15 kHz in frequency. In such an aspect, the frequency band 302 may include about ten frequency interlaces 308 (e.g., M=10). For example, an allocation may include one frequency interlace 308 having ten distributed or equally spaced RBs 310. Compared to an allocation with a single RB or ten localized RBs, the interlaced allocation with the ten distributed RBs 310 allows a UE to transmit with a higher BW occupancy.

In another aspect, the frequency band 302 may have a bandwidth of about 10 MHz and each subcarrier 312 may span about 15 kHz in frequency. In such an aspect, the frequency band 302 may include about five frequency interlaces 308 (e.g., M=5). Similarly, an allocation may include one frequency interlace 308 having ten distributed RBs 310. The interlaced allocation with the ten distributed RBs may allow for a wider BW occupancy than an allocation with a single RB or ten localized RBs.

In another aspect, the frequency band 302 may have a bandwidth of about 20 MHz and each subcarrier 312 may span about 30 kHz in frequency. In such an aspect, the frequency band 302 may include about five frequency interlaces 308 (e.g., M=5). Similarly, an allocation may include one frequency interlace 308 having ten distributed RBs 310. The interlaced allocation with the ten distributed RBs may allow for a wider BW occupancy than an allocation with a single RB or ten localized RBs.

In some aspects, the RBs 310 are physical resource blocks (PRBs) and each frequency interlace 308 may include PRBs uniformly spaced in the frequency band 302.

In the scheme 300, the BS may select one or more frequency interlaces 308 for the uplink communication(s) by the UE in the COT/FFP 320. As an example, the BS selects the frequency interlace $308_{I(0)}$ shown by the patterned boxes for the uplink communication(s) by the UE in the COT/FFP 320. In some other examples, the BS may select a different frequency interlace $308_{I(m)}$, where m may be between 1 and M−1, for the uplink communication(s). Additionally, the BS may allocate any suitable number of frequency interlaces 308 for the uplink communication(s), for example, between 1 to M number of frequency interlaces 308. While FIG. 3B illustrates the frequency interlaces 308 spanning one slot or one RB 310 duration (e.g., the time period 314), the frequency interlaces 308 can span a longer duration, for example, 2, 3, or more slots or any suitable number of symbol 306 durations.

The uplink communication(s) over the frequency interlace $308_{I(0)}$) may include uplink data (PUSCH communication(s)) and/or uplink control information (e.g., PUCCH communication(s)). In some instances, the uplink communication(s) are transmitted using the allocated frequency interlace over one or more resource block set(s). In this regard, where an explicit resource block set allocation is not available in the DCI, in some instances the resource block set(s) for the uplink communication(s) are allocated and/or determined based the resource block set(s) in which the resource element groups of the DCI are transmitted in accordance with the present disclosure.

Figure 4:
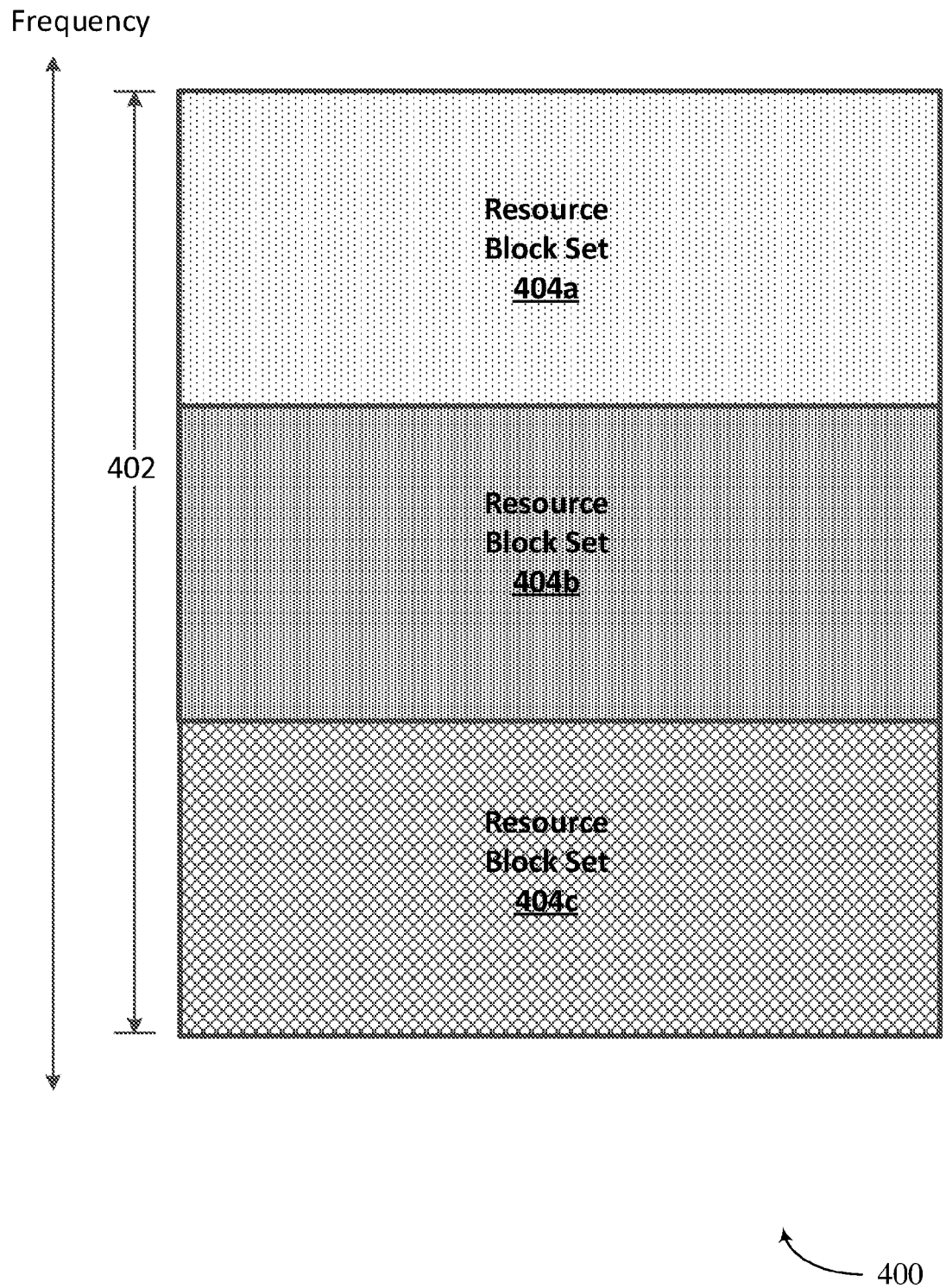
FIG. 4 illustrates aspects of a resource block set allocation scheme according to some aspects of the present disclosure.

FIG. 4 illustrates aspects of a resource block set allocation scheme 400 according to some aspects of the present disclosure. For example, FIG. 4 shows a shared radio frequency band 402. Frequency band 402 may be similar to frequency band 302 discussed above with respect to FIGS. 3A and 3B. In this regard, the frequency band 402 may be a shared radio frequency band or an unlicensed band (e.g., new radio unlicensed (NR-U)) shared by a plurality of network operating entities. As shown, the frequency band 402 is divided into resource block sets 404. In the illustrated example, the frequency band 402 is shown as having three resource block sets (404a, 404b, and 404c) for sake of clarity, but it is understood that the frequency band 402 may be divided into any number of resource block sets in accordance with the present disclosure. In this regard, the number of resource block sets that the frequency band 402 includes can be based on the number of resource blocks and/or groups (in the frequency domain) within each set and the total frequency bandwidth of the frequency band 402. Further, while FIG. 4 illustrates the resource block sets 404 as being contiguous (i.e., formed from consecutive resource blocks in the frequency domain), in other instances the resource block sets 404 can be defined based on non-consecutive resource blocks and/or groups in the frequency domain (e.g., based on a frequency hopping pattern or other distribution, including one or more interlace pattern(s)).

Figure 5A:
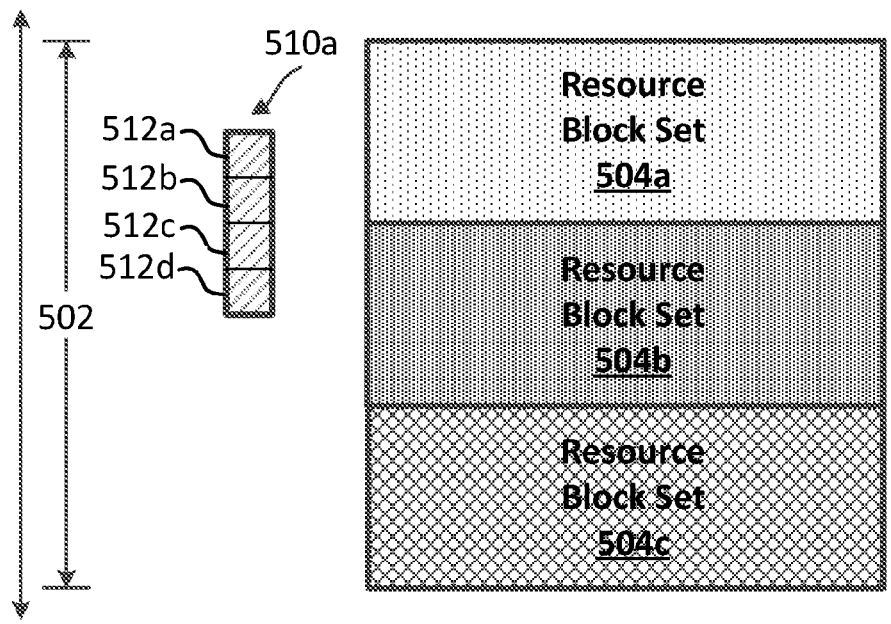
FIG. 5A illustrates aspects of a resource block set allocation scheme according to some aspects of the present disclosure.

FIG. 5A illustrates aspects of a resource block set allocation scheme 500 according to some aspects of the present disclosure. For example, FIG. 5A shows a shared radio frequency band 502. Frequency band 502 may be similar to frequency bands 302 and/or 402 discussed above with respect to FIGS. 3A, 3B, and 4. In this regard, the frequency band 502 may be a shared radio frequency band or an unlicensed band (e.g., new radio unlicensed (NR-U)) shared by a plurality of network operating entities. As shown, the frequency band 502 is divided into resource block sets 504a, 504b, and 504c. FIG. 5A also shows downlink control information 510a having resource element groups 512. In the illustrated example, the DCI 510a is shown occupying four resource element groups (512a, 512b, 512c, and 512d) for sake of clarity, but it is understood that the DCI 510a may have any suitable number of resource element groups. Further, in the illustrated example, the DCI 510a extends across portions of both resource block set 504a and resource block set 504b. For example, resource element groups 512a and 512b of the DCI 510a are within the resource block set 504a, while resource element groups 512c and 512d of the DCI 510a are within the resource block set 504b. In some aspects of the present disclosure, the location(s) of one or more of the resource element groups 512a, 512b, 512c, and/or 512d of the DCI 510a relative to the resource block sets 504a, 504b, and 504c determines and/or indicates the resource block set(s) a UE should utilize for uplink communication(s) with a BS.

Figure 5B:
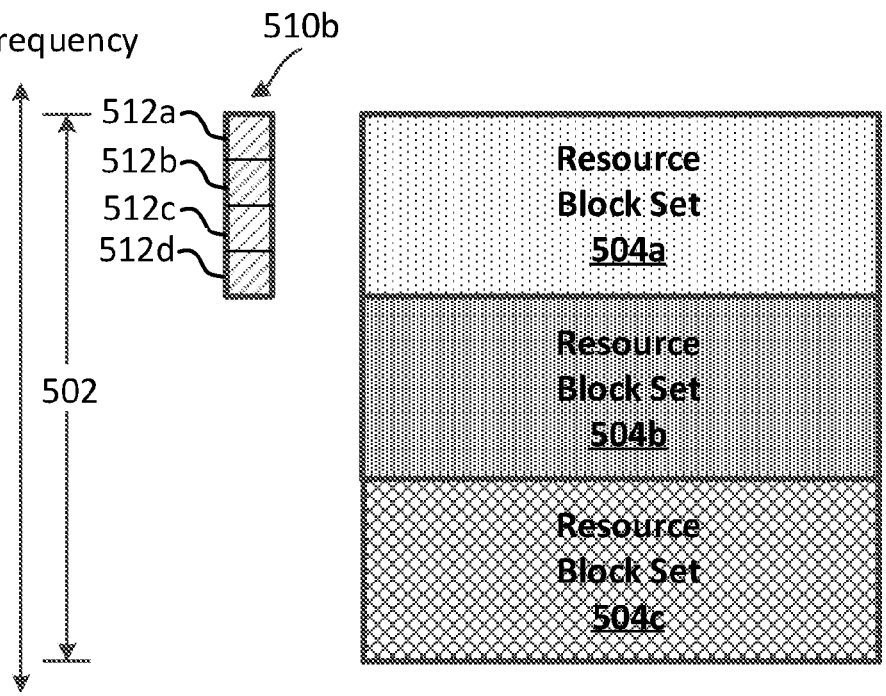
FIG. 5B illustrates aspects of a resource block set allocation scheme according to some aspects of the present disclosure.

FIG. 5B illustrates aspects of a resource block set allocation scheme 550 according to some aspects of the present disclosure. FIG. 5B is similar to FIG. 5A in many respects but illustrates an aspect of the present disclosure where a DCI is positioned entirely within a single resource block set. For example, a DCI 510b is positioned entirely within resource block set 504a. That is, resource element groups 512a, 512b, 512c, and 512d of the DCI 510b are within the resource block set 504a. As noted above, in some aspects of the present disclosure, the location(s) of one or more of the resource element groups 512a, 512b, 512c, and/or 512d of the DCI 510b relative to the resource block sets 504a, 504b, and 504c determines and/or indicates the resource block set(s) a UE should utilize for uplink communication(s) with a BS.

Figure 6A:
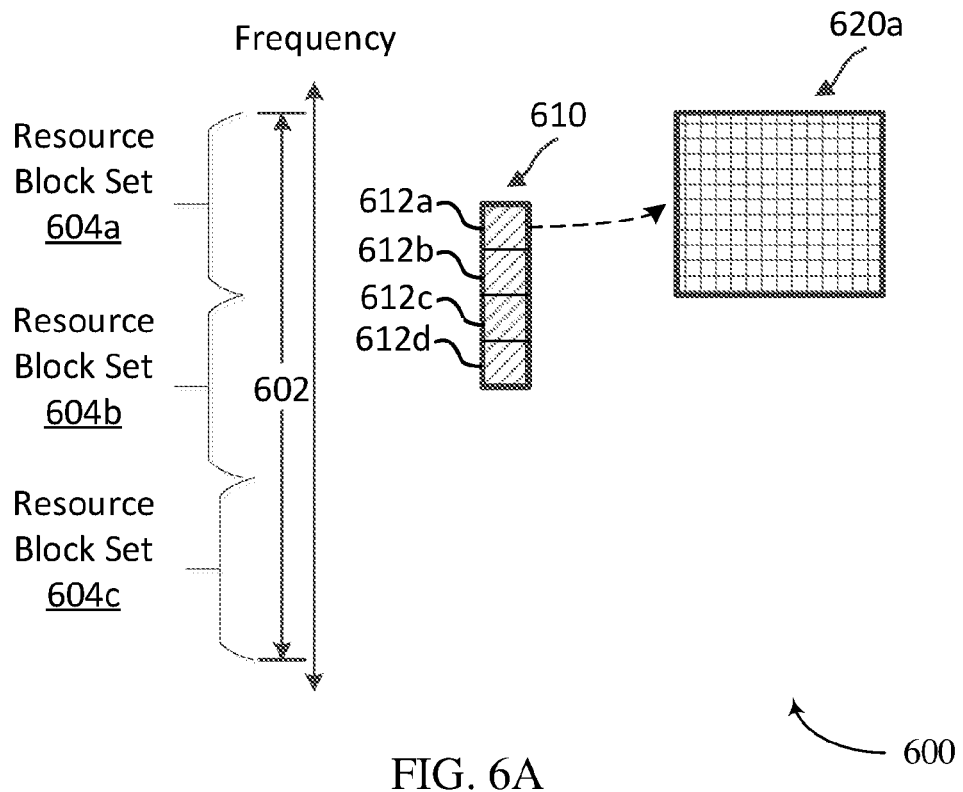
FIG. 6A illustrates a resource block set allocation scheme according to some aspects of the present disclosure.

FIG. 6A illustrates a resource block set allocation scheme 600 according to some aspects of the present disclosure. For example, FIG. 6A shows a shared radio frequency band 602. Frequency band 602 may be similar to frequency bands 302, 402, and/or 502 discussed above with respect to FIGS. 3A, 3B, 4, 5A, and 5B. In this regard, the frequency band 602 may be a shared radio frequency band or an unlicensed band (e.g., new radio unlicensed (NR-U)) shared by a plurality of network operating entities. As shown, the frequency band 602 is divided into resource block sets 604a, 604b, and 604c. FIG. 6A also shows downlink control information 610 having resource element groups 612. In the illustrated example, the DCI 610 is shown occupying four resource element groups (612a, 612b, 612c, and 612d) for sake of clarity, but it is understood that the DCI 610 may have any suitable number of resource element groups. Further, in the illustrated example, the DCI 610 extends across portions of both resource block set 604a and resource block set 604b. For example, resource element groups 612a and 612b of the DCI 610 are within the resource block set 604a, while resource element groups 612c and 612d of the DCI 610 are within the resource block set 604b. In some aspects of the present disclosure, the location of first or starting resource element group 612a of the DCI 610 relative to the resource block sets 604a, 604b, and 604c determines and/or indicates the resource block set(s) a UE should utilize for uplink communication(s) with a BS. Accordingly, in the illustrated example of FIG. 6A, because the resource element group 612a is located within the frequency range of the resource block set 604a, the resource block set 604a is utilized for uplink communication 620a, as shown.

In this regard, a BS may allocate a particular resource block set (e.g., 604a, 604b, or 604c) to a UE by transmitting the DCI 610 such that the resource element group 612a is located within the frequency range of the resource block set the BS wishes to allocate to the UE for the uplink communication(s). Likewise, the UE can determine which particular resource block set (e.g., 604a, 604b, or 604c) to use for the uplink communication(s) based on the location of the resource element group 612a of the DCI 610. In this regard, the UE may utilize a frequency interlace as explicitly indicated in the DCI 610 along with the resource block set as indicated by the location of the starting or first resource element group of the DCI.

Figure 6B:
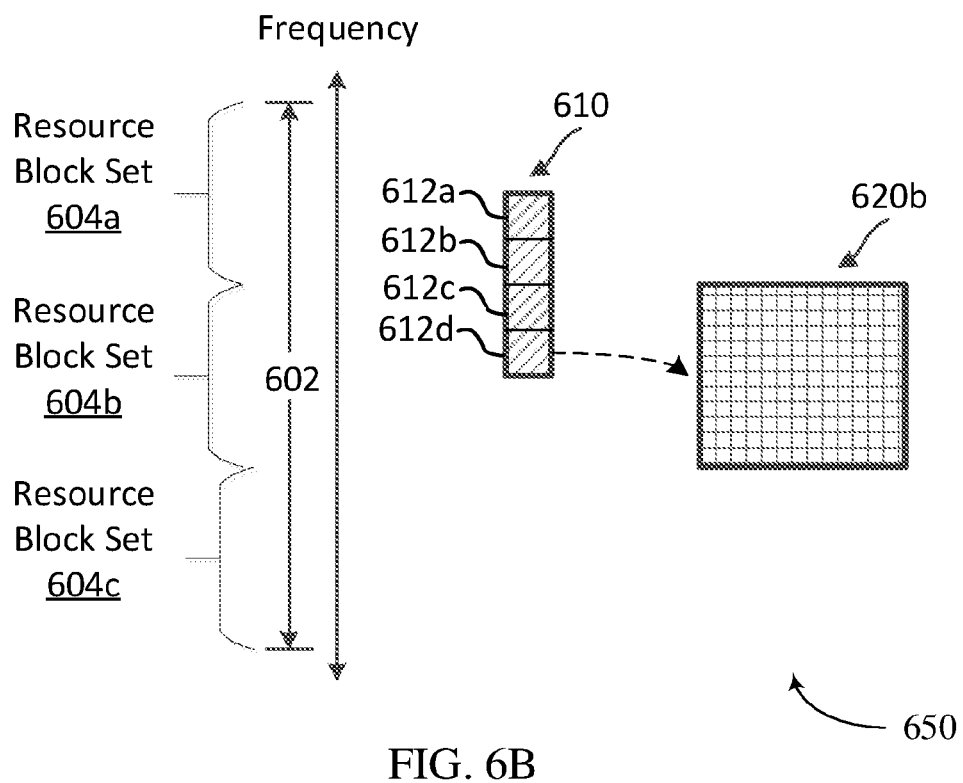
FIG. 6B illustrates a resource block set allocation scheme according to some aspects of the present disclosure.

FIG. 6B illustrates a resource block set allocation scheme 650 according to some aspects of the present disclosure. FIG. 6B is similar to FIG. 6A in many respects but illustrates an aspect of the present disclosure where the location of ending or last resource element group 612d of the DCI 610 relative to the resource block sets 604a, 604b, and 604c determines and/or indicates the resource block set(s) a UE should utilize for uplink communication(s) with a BS. Accordingly, in the illustrated example of FIG. 6B, because the resource element group 612d is located within the frequency range of the resource block set 604b, the resource block set 604b is utilized for uplink communication 620b, as shown.

In this regard, a BS may allocate a particular resource block set (e.g., 604a, 604b, or 604c) to a UE by transmitting the DCI 610 such that the resource element group 612d is located within the frequency range of the resource block set the BS wishes to allocate to the UE for the uplink communication(s). Likewise, the UE can determine which particular resource block set (e.g., 604a, 604b, or 604c) to use for the uplink communication(s) based on the location of the resource element group 612d of the DCI 610. In this regard, the UE may utilize a frequency interlace as explicitly indicated in the DCI 610 along with the resource block set as indicated by the location of the ending or last resource element group of the DCI.

In some aspects of the present disclosure, the UE determines which resource block set(s) 604 the resource element groups 612a, 612b, 612c, and 612d of the DCI 610 occupies and then selects a particular resource block set for the uplink communication(s). For example, in some instances the UE selects the lowest indexed resource block set from among the resource block sets occupied by the DCI. Accordingly, in the illustrated example of FIG. 6A, the UE can determine that the DCI 610 is located within the frequency range of the resource block sets 604a and 604b and then select resource block set 604a as the lowest indexed resource block set from among the occupied resource block sets (i.e., resource block sets 604a and 604b). The UE can then utilize the resource block set 604a for uplink communication 620a, as shown.

In other instances, the UE selects the highest indexed resource block set from among the resource block sets occupied by the DCI. Accordingly, in the illustrated example of FIG. 6A, the UE can determine that the DCI 610 is located within the frequency range of the resource block sets 604a and 604b and then select resource block set 604b as the highest indexed resource block set from among the occupied resource block sets (i.e., resource block sets 604a and 604b). The UE can then utilize the resource block set 604b for uplink communication 620b, as shown.

Figure 7:
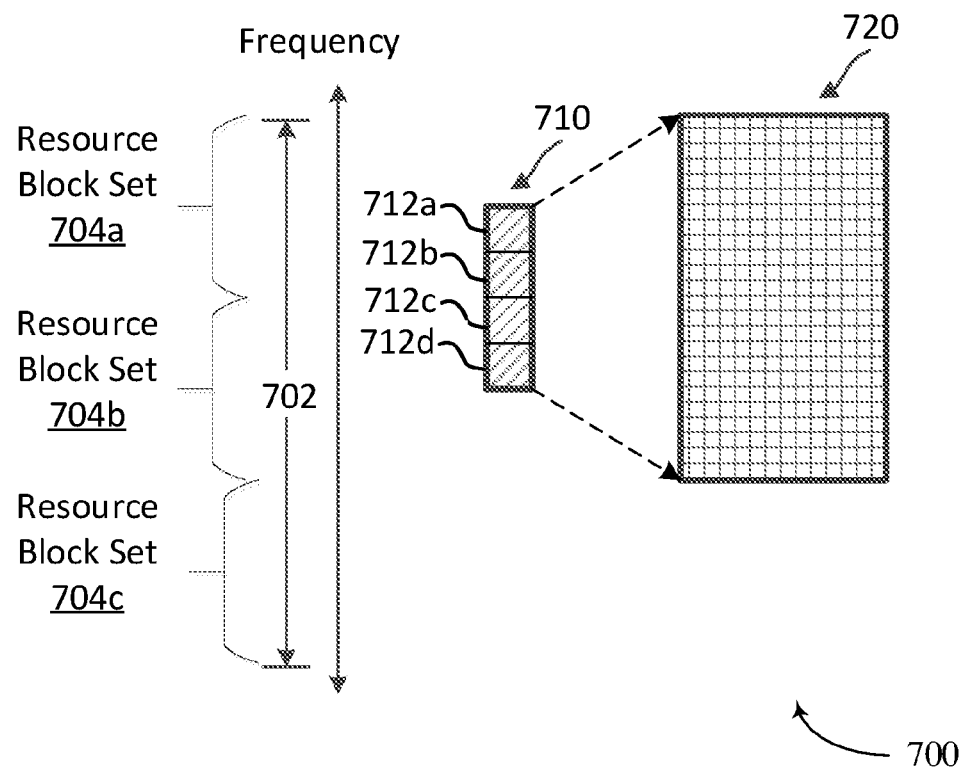
FIG. 7 illustrates a resource block set allocation scheme according to some aspects of the present disclosure.

FIG. 7 illustrates a resource block set allocation scheme 700 according to some aspects of the present disclosure. For example, FIG. 7 shows a shared radio frequency band 702. Frequency band 702 may be similar to frequency bands 302, 402, 502, and/or 602 discussed above with respect to FIGS. 3A, 3B, 4, 5A, 5B, 6A, and 6B. In this regard, the frequency band 702 may be a shared radio frequency band or an unlicensed band (e.g., new radio unlicensed (NR-U)) shared by a plurality of network operating entities. As shown, the frequency band 702 is divided into resource block sets 704a, 704b, and 704c. FIG. 7 also shows downlink control information 710 having resource element groups 712. In the illustrated example, the DCI 710 is shown occupying four resource element groups (712a, 712b, 712c, and 712d) for sake of clarity, but it is understood that the DCI 710 may have any suitable number of resource element groups. Further, in the illustrated example, the DCI 710 extends across portions of both resource block set 704a and resource block set 704b. For example, resource element groups 712a and 712b of the DCI 710 are within the resource block set 704a, while resource element groups 712c and 712d of the DCI 710 are within the resource block set 704b. In some aspects of the present disclosure, the location of first or starting resource element group 712a and the last or ending resource element group 712d of the DCI 710 relative to the resource block sets 704a, 704b, and 704c determines and/or indicates the resource block set(s) a UE should utilize for uplink communication(s) with a BS. Accordingly, in the illustrated example of FIG. 7, because the resource element group 712a is located within the frequency range of the resource block set 704a and the resource element group 712d is located within the frequency range of the resource block set 704b, the resource block set 704a and the resource block set 704b are both utilized for uplink communication 720, as shown.

In this regard, a BS may allocate particular resource block sets (e.g., 704a, 704b, or 704c) to a UE by transmitting the DCI 710 such that the resource element groups 712a and 712d are located within the frequency range(s) of the resource block set(s) the BS wishes to allocate to the UE for the uplink communication(s). Likewise, the UE can determine which particular resource block set(s) (e.g., 704a, 704b, and/or 704c) to use for the uplink communication(s) based on the location of the resource element groups 712a and 712d of the DCI 710. In this regard, the UE may utilize a frequency interlace as explicitly indicated in the DCI 710 along with the resource block set(s) as indicated by the location of the starting and ending resource element groups of the DCI.

Figure 8A:
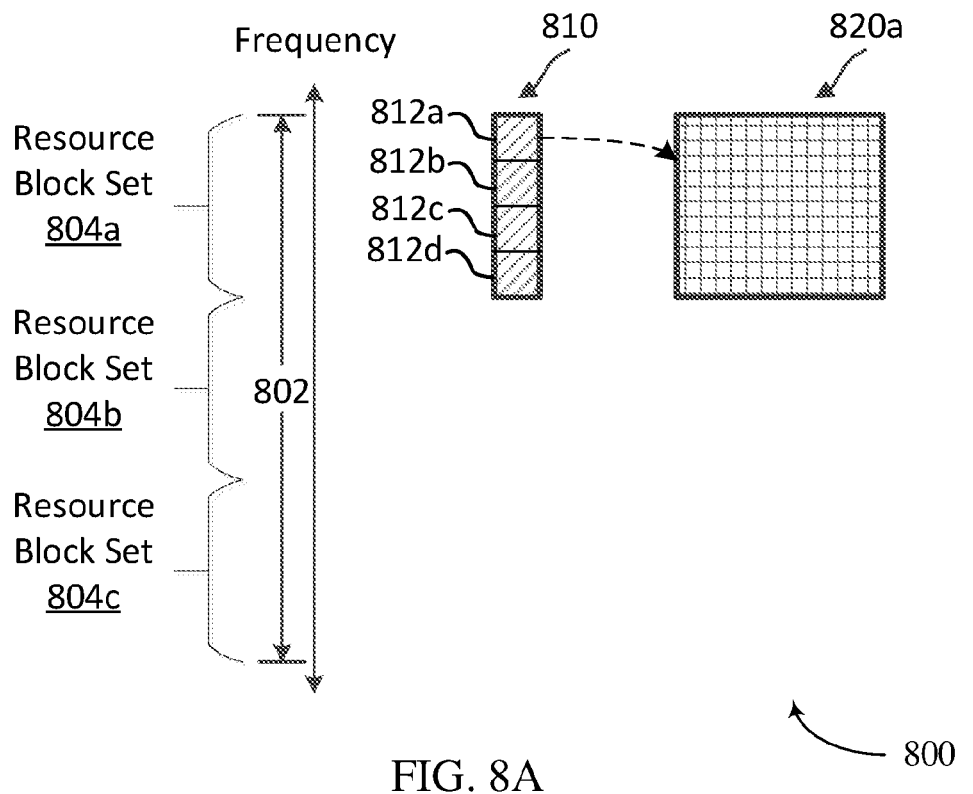
FIG. 8A illustrates a resource block set allocation scheme according to some aspects of the present disclosure.

FIG. 8A illustrates a resource block set allocation scheme 800 according to some aspects of the present disclosure. For example, FIG. 8A shows a shared radio frequency band 802. Frequency band 802 may be similar to frequency bands 302, 402, 502, 602, and/or 702 discussed above with respect to FIGS. 3A, 3B, 4, 5A, 5B, 6A, 6B, and 7. In this regard, the frequency band 802 may be a shared radio frequency band or an unlicensed band (e.g., new radio unlicensed (NR-U)) shared by a plurality of network operating entities. As shown, the frequency band 802 is divided into resource block sets 804a, 804b, and 804c. FIG. 8A also shows downlink control information 810 having resource element groups 812. In the illustrated example, the DCI 810 is shown occupying four resource element groups (812a, 812b, 812c, and 812d) for sake of clarity, but it is understood that the DCI 810 may have any suitable number of resource element groups. Further, in the illustrated example, the DCI 810 is located entirely within resource block set 804a. For example, resource element groups 812a, 812b, 812c, and 812d of the DCI 810 are within the resource block set 804a.

In some aspects of the present disclosure, the location of first or starting resource element group 812a of the DCI 810 relative to the resource block sets 804a, 804b, and 804c determines and/or indicates the resource block set(s) a UE should utilize for uplink communication(s) with a BS. Accordingly, in the illustrated example of FIG. 8A, because the resource element group 812a is located within the frequency range of the resource block set 804a, the resource block set 804a is utilized for uplink communication 820a, as shown.

In this regard, a BS may allocate a particular resource block set (e.g., 804a, 804b, or 804c) to a UE by transmitting the DCI 810 such that the resource element group 812a is located within the frequency range of the resource block set the BS wishes to allocate to the UE for the uplink communication(s). Likewise, the UE can determine which particular resource block set (e.g., 804a, 804b, or 804c) to use for the uplink communication(s) based on the location of the resource element group 812a of the DCI 810. In this regard, the UE may utilize a frequency interlace as explicitly indicated in the DCI 810 along with the resource block set as indicated by the location of the starting or first resource element group of the DCI.

Figure 8B:
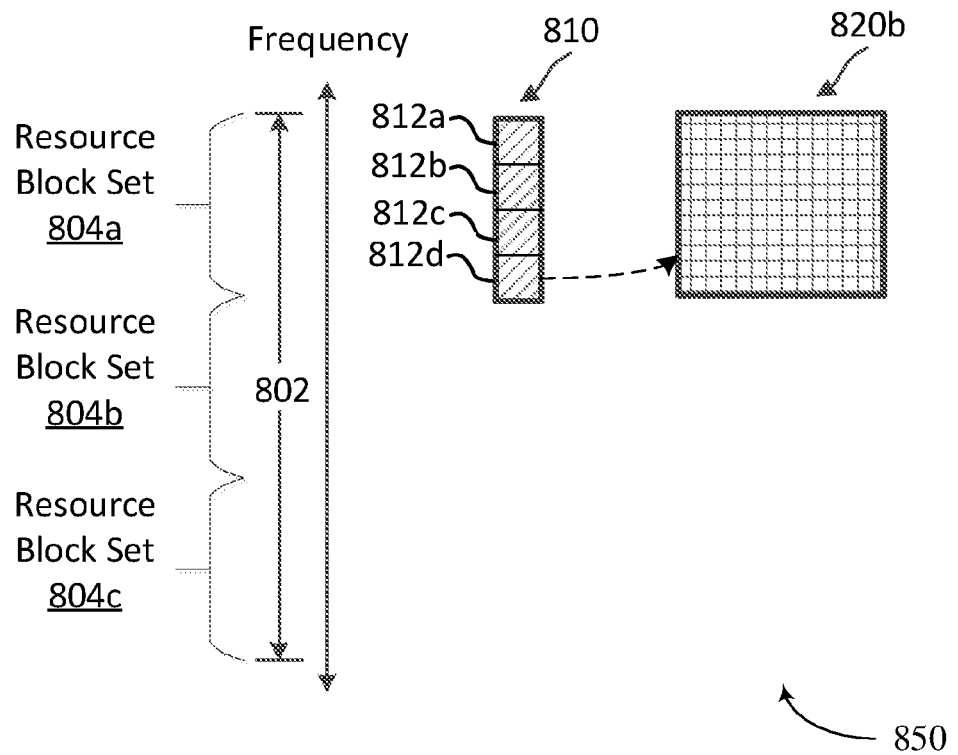
FIG. 8B illustrates a resource block set allocation scheme according to some aspects of the present disclosure.

FIG. 8B illustrates a resource block set allocation scheme 850 according to some aspects of the present disclosure. FIG. 8B is similar to FIG. 8A in many respects but illustrates an aspect of the present disclosure where the location of ending or last resource element group 812d of the DCI 810 relative to the resource block sets 804a, 804b, and 804c determines and/or indicates the resource block set(s) a UE should utilize for uplink communication(s) with a BS. Accordingly, in the illustrated example of FIG. 8B, because the resource element group 812d is located within the frequency range of the resource block set 804a, the resource block set 804a is utilized for uplink communication 820b, as shown.

In this regard, a BS may allocate a particular resource block set (e.g., 804a, 804b, or 804c) to a UE by transmitting the DCI 810 such that the resource element group 812d is located within the frequency range of the resource block set the BS wishes to allocate to the UE for the uplink communication(s). Likewise, the UE can determine which particular resource block set (e.g., 804a, 804b, or 804c) to use for the uplink communication(s) based on the location of the resource element group 812d of the DCI 810. In this regard, the UE may utilize a frequency interlace as explicitly indicated in the DCI 810 along with the resource block set as indicated by the location of the ending or last resource element group of the DCI.

Figure 9:
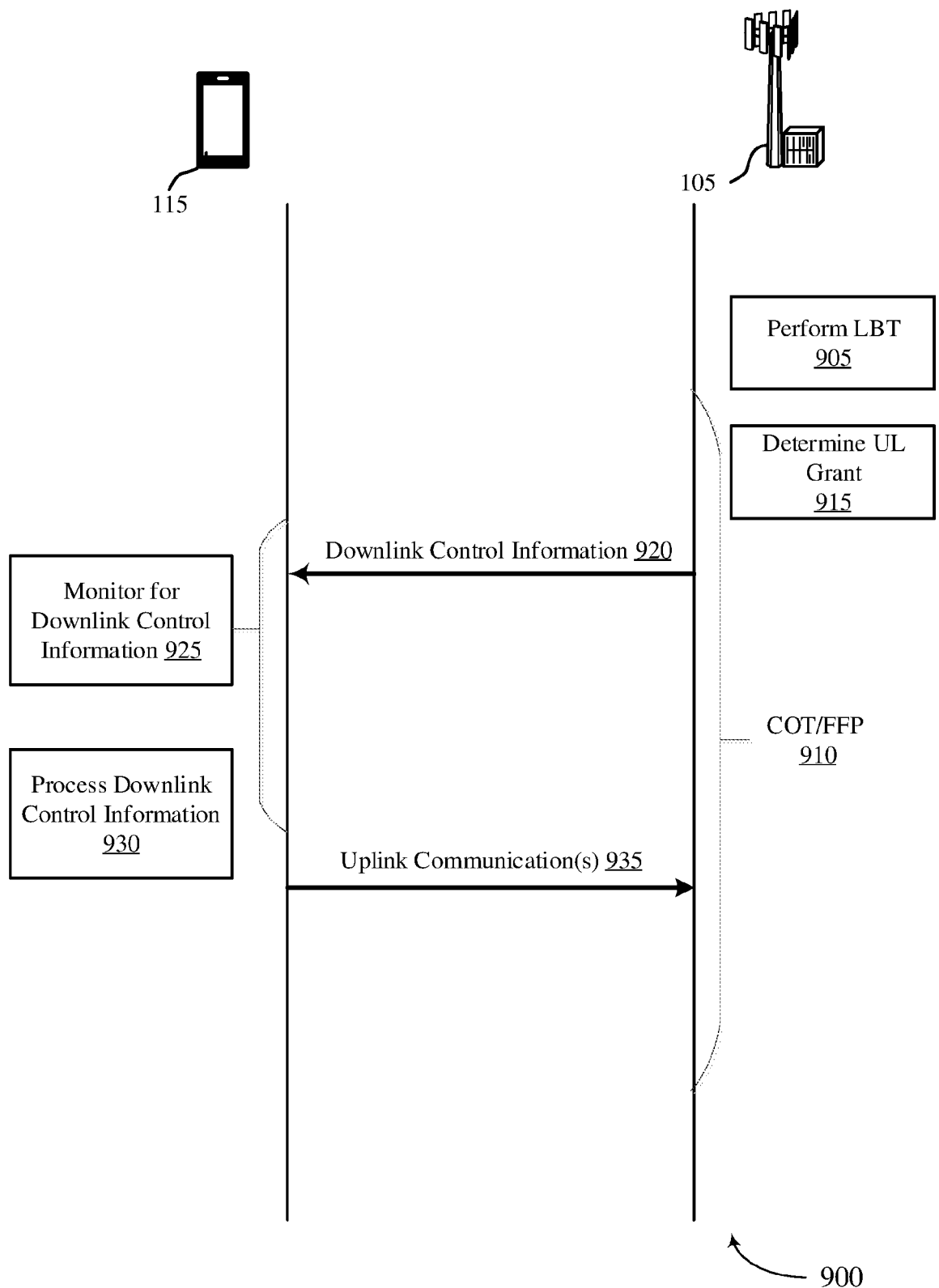
FIG. 9 illustrates a signaling diagram of a resource block set allocation scheme according to some aspects of the present disclosure.

FIG. 9 illustrates a signaling diagram of a resource block set allocation scheme 900 according to some aspects of the present disclosure. At 905, the BS 105 performs an LBT to contend for a COT/FFP 910 of a shared radio frequency band (e.g., new radio unlicensed (NR-U)). In the illustrated example, the BS 105 wins the contention for the COT/FFP 910 and, therefore, can occupy the COT/FFP 910.

At 915, the BS 105 determines an uplink grant for the UE 115. In this regard, a BS may determine to allocate a frequency interlace and/or particular resource block set(s) to a UE for uplink communication(s). In some aspects of the present disclosure, the BS indicates the allocated frequency interlace explicitly in downlink control information (DCI) and indicates the allocated resource block set(s) to the UE implicitly through a location of one or more resource element groups of the DCI relative to the frequency range of resource block set(s) of the shared radio frequency band (see, e.g., FIGS. 6A, 6B, 7, 8A, and 8B).

At 920, the BS 105 transmits downlink control information (DCI) in a search space of the shared radio frequency band (e.g., new radio unlicensed (NR-U)). The BS can transmit the DCI in a common search space of a physical downlink control channel (PDCCH) and/or a user-equipment specific search space of the PDCCH. In some instances, the DCI includes an explicit interlace allocation but does not include an explicit resource block set allocation. In some instances, the BS transmits all resource element groups of the DCI within a single resource block set. In some instances, the BS transmits the resource element groups of the DCI across multiple resource block sets. For example, a first resource element group of the DCI can be transmitted within a first resource block set and a second resource element group of the DCI can be transmitted within a second resource block set different than the first resource block set. The resource element groups of the DCI may be transmitted over 1, 2, 3, 4, etc. resource block sets. In some instances, the DCI transmitted by the BS is in DCI format 0_0.

At 925, the UE 115 monitors for the DCI. In some instances, the UE 115 monitors for the DCI in a search space of a shared radio frequency band (e.g., new radio unlicensed (NR-U)). The UE can monitor for the DCI in a common search space of a physical downlink control channel (PDCCH) and/or a user-equipment specific search space of the PDCCH. The UE can receive, based on the monitoring at 925, the DCI from the BS 105. In some instances, the DCI includes an explicit interlace allocation but does not include an explicit resource block set allocation. In some instances, the UE receives all resource element groups of the DCI within a single resource block set. In some instances, the UE receives the resource element groups of the DCI across multiple resource block sets. For example, a first resource element group of the DCI can be received within a first resource block set and a second resource element group of the DCI can be received within a second resource block set different than the first resource block set. The resource element groups of the DCI may be received over 1, 2, 3, 4, etc. resource block sets. In some instances, the DCI received is in DCI format 0_0.

At 930, the UE 115 processes the received DCI. In this regard, the UE 115 can decode the DCI to determine the parameters explicitly indicated by the DCI (e.g., a frequency interlace allocation) and also determine the location of the resource element groups of the DCI relative to the resource block sets of the shared radio frequency band. As discussed with respect to FIGS. 5A, 5B, 6A, 6B, 7, 8A, and 8B, the location(s) of one or more of the resource element groups of the DCI relative to the resource block sets of the shared radio frequency band can determine and/or indicate the resource block set(s) the UE 115 should utilize for uplink communication(s) with the BS 105. For example, in some instances the UE 115 determines a resource block set for transmitting the uplink communication(s) based on the resource block set in which the starting or first resource element group of the DCI is received. Similarly, in some instances the UE 115 determines a resource block set for transmitting the uplink communication(s) based on the resource block set in which the ending or last resource element group of the DCI is received. Further, in some instances, the UE 115 determines one or more resource block sets for the uplink communication based on the resource block set(s) in which resource element group(s) of the DCI are received, which may be determined in some instances based on the resource block set(s) in which the starting and ending resource element groups of the DCI are received (and include any intervening resource block set(s), in some instances).

At 935, the UE 115 transmits uplink communication(s) to the BS 105 based on the DCI. In this regard, the UE 115 may utilize a frequency interlace as explicitly indicated in the DCI received from the BS 105 along with the resource block set as indicated and/or determined by the location of one or more resource element group(s) of the DCI. Accordingly, in some instances the UE 115 transmits the uplink communication(s) using the resource block set in which the starting or first resource element group of the DCI was received. Similarly, in some instances the UE 115 transmits the uplink communication(s) using the resource block set in which the ending or last resource element group of the DCI was received. Further, in some instances, the UE transmits the uplink communication(s) using the plurality of resource block sets in which one or more resource element groups of the DCI were received. Regardless of which resource block set(s) the uplink communication is transmitted over, the UE can utilize the interlace allocation for the uplink communication as indicated in the DCI. In some instances, the uplink communication(s) include uplink data communication(s) (e.g., physical uplink shared channel (PUSCH) communication(s)).

Figure 10:
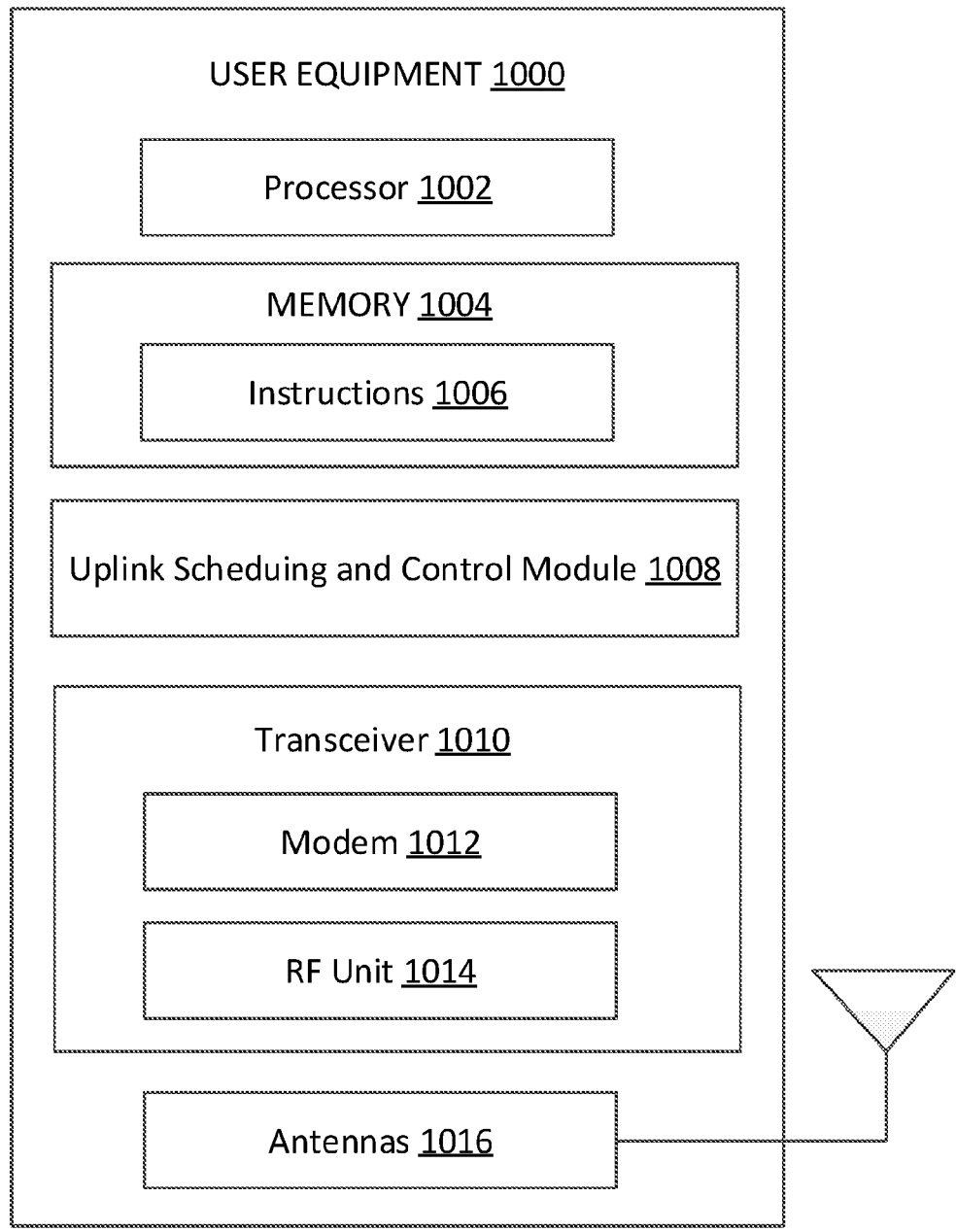
FIG. 10 is a block diagram of a user equipment (UE) according to some aspects of the present disclosure.

FIG. 10 is a block diagram of an exemplary UE 1000 according to some aspects of the present disclosure. The UE 1000 may be a UE 115 discussed above in FIG. 1. As shown, the UE 1000 may include a processor 1002, a memory 1004, an uplink scheduling and control module 1008, a transceiver 1010 including a modem subsystem 1012 and a radio frequency (RF) unit 1014, and one or more antennas 1016. These elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to the UEs 115 in connection with aspects of the present disclosure, for example, aspects of FIGS. 2-7 and 10. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The uplink scheduling and control module 1008 may be implemented via hardware, software, or combinations thereof. For example, the uplink scheduling and control module 1008 may be implemented as a processor, circuit, and/or instructions 1006 stored in the memory 1004 and executed by the processor 1002. In some instances, the uplink scheduling and control module 1008 can be integrated within the modem subsystem 1012. For example, the uplink scheduling and control module 1008 can be implemented by a combination of software components (e.g., executed by a DSP or a general processor) and hardware components (e.g., logic gates and circuitry) within the modem subsystem 1012.

The uplink scheduling and control module 1008 may be used for various aspects of the present disclosure, for example, aspects of aspects of FIGS. 2-9 and 12. The uplink scheduling and control module 1008 is configured to monitor, in a search space of a shared radio frequency band, for a downlink communication from a base station (e.g., the BSs 105 and/or 1100), receive DCI from the BS, determine resource block set(s) for uplink communication(s) based on the location of one or more resource block groups of the DCI, transmit uplink communication(s) (e.g., PUCCH and/or PUSCH communication(s)) to the base station based on the DCI, and/or communicate DL communications (e.g., PDCCH and/or PDSCH) with the BS.

As shown, the transceiver 1010 may include the modem subsystem 1012 and the RF unit 1014. The transceiver 1010 can be configured to communicate bi-directionally with other devices, such as the BSs 105. The modem subsystem 1012 may be configured to modulate and/or encode the data from the memory 1004 and/or the uplink scheduling and control module 1008 according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., PUCCH control information, PRACH signals, PUSCH data) from the modem subsystem 1012 (on outbound transmissions) or of transmissions originating from another source such as another UE 115 or a BS 105. The RF unit 1014 may be further configured to perform analog beamforming in conjunction with the digital beamforming. Although shown as integrated together in transceiver 1010, the modem subsystem 1012 and the RF unit 1014 may be separate devices that are coupled together at the UE 115 to enable the UE 115 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The transceiver 1010 may provide the demodulated and decoded data (e.g., DCI, SSBs, RMSI, MIB, SIB, FBE configuration, PRACH configuration PDCCH, PDSCH) to the uplink scheduling and control module 1008 for processing. The antennas 1016 may include multiple antennas of similar or different designs in order to sustain multiple transmission links. The RF unit 1014 may configure the antennas 1016.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

Figure 11:
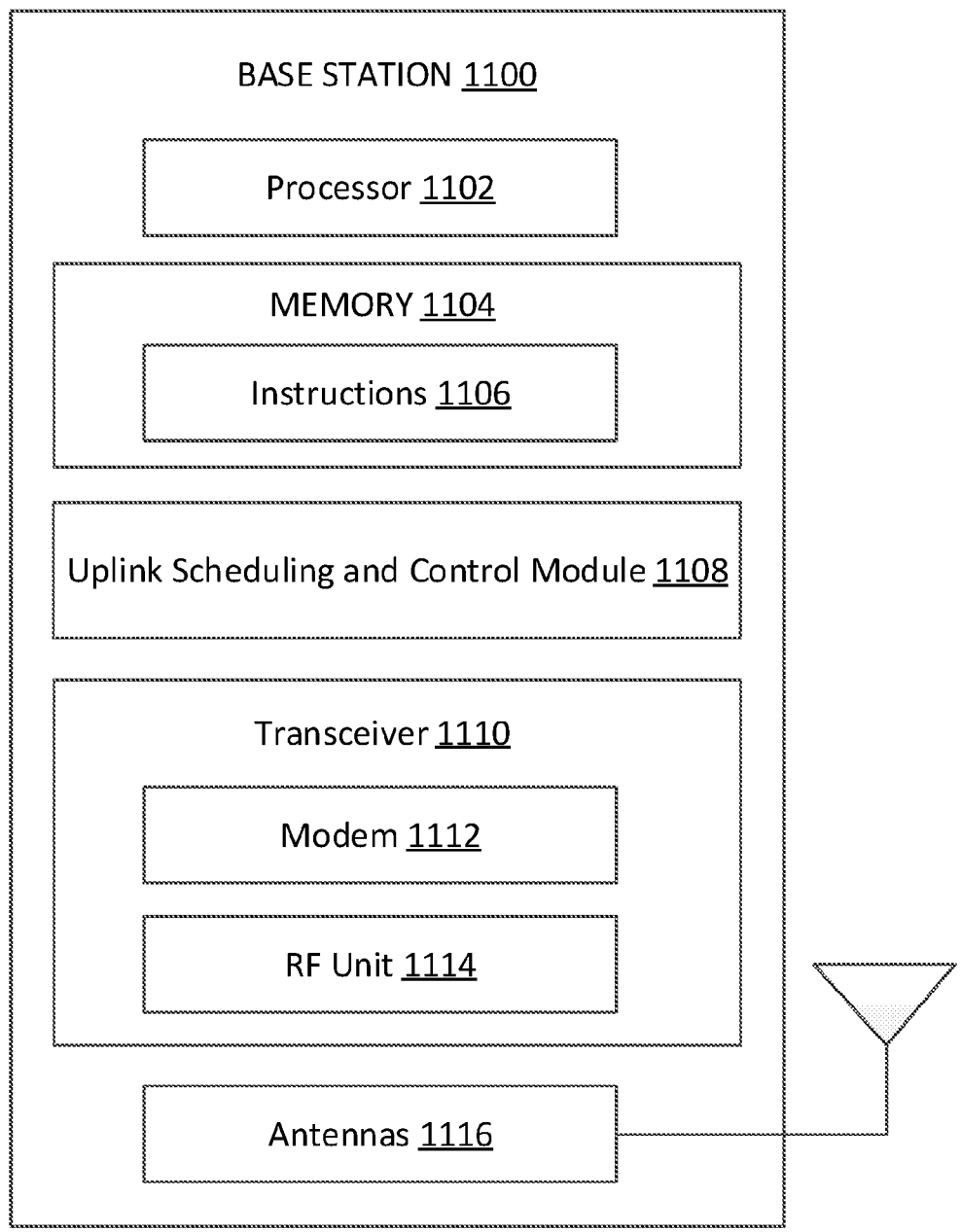
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIGS. 1 and 3A. A shown, the BS 1100 may include a processor 1102, a memory 1104, an uplink scheduling and control module 1108, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 2-7 and 11. Instructions 1106 may also be referred to as code, which may be interpreted broadly to include any type of computer-readable statement(s) as discussed above.

The uplink scheduling and control module 1108 may be implemented via hardware, software, or combinations thereof. For example, the uplink scheduling and control module 1108 may be implemented as a processor, circuit, and/or instructions 1106 stored in the memory 1104 and executed by the processor 1102. In some instances, the uplink scheduling and control module 1108 can be integrated within the modem subsystem 1112. For example, the uplink scheduling and control module 1108 can be implemented by a combination of software components (e.g., executed by a DSP or a general processor) and hardware components (e.g., logic gates and circuitry) within the modem subsystem 1112.

The uplink scheduling and control module 1108 may be used for various aspects of the present disclosure, for example, aspects of aspects of FIGS. 2-9 and 13. The uplink scheduling and control module 1108 can be configured to determine an uplink grant for a UE, transmit downlink control information (DCI) to the UE indicating the UL grant (e.g., explicitly indicating an allocated frequency interlace and implicitly indicating allocated resource block set(s)), receive uplink communication(s) (e.g., PUCCH and/or PUSCH communications) from the UE based on the DCI, and/or communicate DL communications (e.g., PDCCH and/or PDSCH) with the UE.

As shown, the transceiver 1110 may include the modem subsystem 1112 and the RF unit 1114. The transceiver 1110 can be configured to communicate bi-directionally with other devices, such as the UEs 115 and/or 1000, another BS 105, and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 1112 (on outbound transmissions) or of transmissions originating from another source, such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., PUCCH control information, PRACH signals, PUSCH data) to the uplink scheduling and control module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
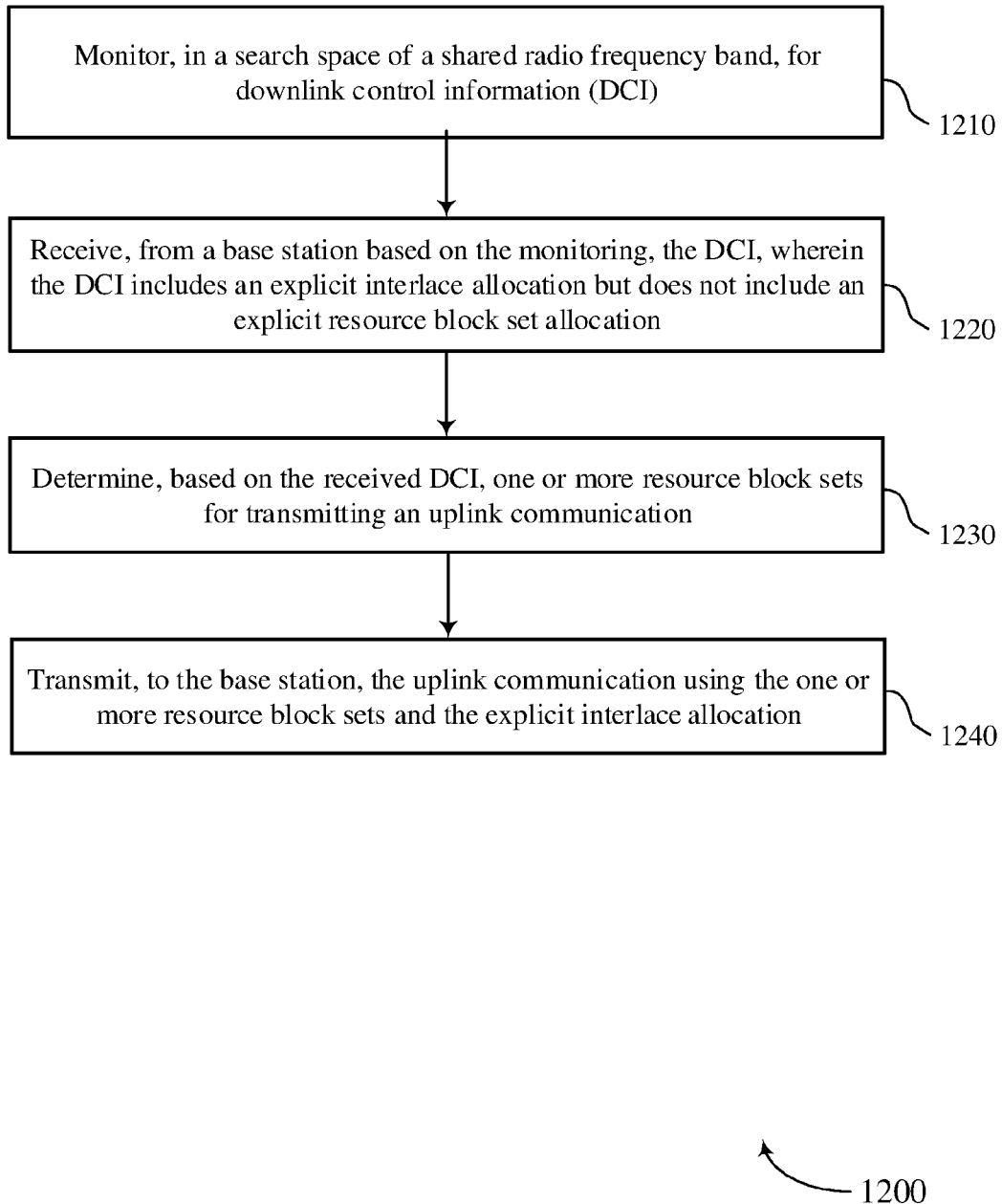
FIG. 12 is a flow diagram of a communication method according to some aspects of the present disclosure.

FIG. 12 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a UE, such as the UEs 115 and/or 1000, may utilize one or more components, such as the processor 1002, the memory 1004, the uplink scheduling and control module 1008, the transceiver 1010, and/or the one or more antennas 1016, to execute the steps of method 1200. The method 1200 may employ similar mechanisms as described above with respect to FIGS. 2-9. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, the UE monitors for downlink control information (DCI) in a search space of a shared radio frequency band (e.g., new radio unlicensed (NR-U)). The UE can monitor for the DCI in a common search space of a physical downlink control channel (PDCCH) and/or a user-equipment specific search space of the PDCCH.

At block 1220, the UE receives, from a base station based on the monitoring at 1210, the DCI. In some instances, the DCI includes an explicit interlace allocation but does not include an explicit resource block set allocation. In some instances, the UE receives all resource element groups of the DCI within a single resource block set. In some instances, the UE receives the resource element groups of the DCI across multiple resource block sets. For example, a first resource element group of the DCI can be received within a first resource block set and a second resource element group of the DCI can be received within a second resource block set different than the first resource block set. The resource element groups of the DCI may be received over 1, 2, 3, 4, etc. resource block sets. In some instances, the DCI received is in DCI format 0_0.

At block 1230, the UE determines, based on the received DCI, one or more resource block sets for transmitting an uplink communication. In some instances, the UE determines the one or more resource block sets based on a starting or first resource element group of the DCI, an ending or last resource element group of the DCI, all of the resource element groups of the DCI, a subset of the resource element groups of the DCI, and/or combinations thereof. For example, in some instances the UE determines a resource block set for transmitting the uplink communication based on the resource block set in which the starting or first resource element group of the DCI is received. Similarly, in some instances the UE determines a resource block set for transmitting the uplink communication based on the resource block set in which the ending or last resource element group of the DCI is received. Further, in some instances, the UE determines one or more resource block sets for the uplink communication based on the resource block set(s) in which resource element group(s) of the DCI are received, which may be determined in some instances based on the resource block set(s) in which the starting and ending resource element groups of the DCI are received (including any intervening resource block set(s)).

At block 1240, the UE transmits the uplink communication to the base station using the one or more resource block sets (as determined at 1230) and the explicit interlace allocation (included in the DCI received at 1220). Accordingly, in some instances the UE transmits the uplink communication using the resource block set in which the starting or first resource element group of the DCI was received. Similarly, in some instances the UE transmits the uplink communication using the resource block set in which the ending or last resource element group of the DCI was received. Further, in some instances, the UE transmits the uplink communication using the plurality of resource block sets in which one or more resource element groups of the DCI were received. Regardless of which resource block set(s) the uplink communication is transmitted over, the UE can utilize the interlace allocation for the uplink communication as indicated in the DCI. In some instances, the uplink communication includes an uplink data communication (e.g., a physical uplink shared channel (PUSCH) communication).

Figure 13:
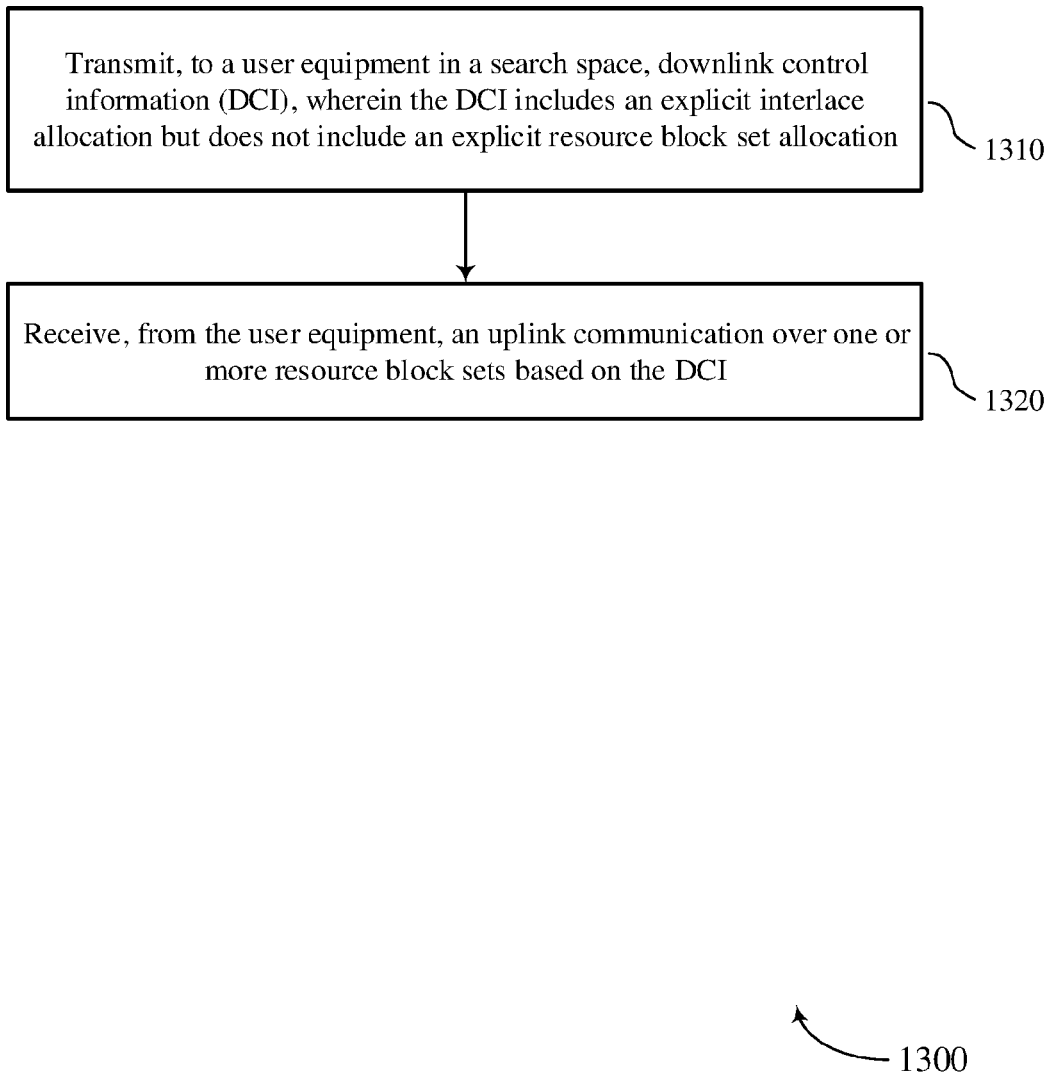
FIG. 13 is a flow diagram of a communication method according to some aspects of the present disclosure.

FIG. 13 is a flow diagram of a communication method 1300 according to some aspects of the present disclosure. Steps of the method 1300 can be executed by a computing device (e.g., a processor, processing circuit, and/or other suitable component) of an apparatus or other suitable means for performing the steps. For example, a BS, such as the BSs 105 and/or 1100, may utilize one or more components, such as the processor 1102, the memory 1104, the uplink scheduling and control module 1108, the transceiver 1110, and/or the one or more antennas 1116, to execute the steps of method 1300. The method 1300 may employ similar mechanisms as described above with respect to FIGS. 2-9. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, the BS transmits downlink control information (DCI) to a UE in a search space of a shared radio frequency band (e.g., new radio unlicensed (NR-U)). The BS can transmit the DCI in a common search space of a physical downlink control channel (PDCCH) and/or a user-equipment specific search space of the PDCCH. In some instances, the DCI includes an explicit interlace allocation but does not include an explicit resource block set allocation. In some instances, the BS transmits all resource element groups of the DCI within a single resource block set. In some instances, the BS transmits the resource element groups of the DCI across multiple resource block sets. For example, a first resource element group of the DCI can be transmitted within a first resource block set and a second resource element group of the DCI can be transmitted within a second resource block set different than the first resource block set. The resource element groups of the DCI may be transmitted over 1, 2, 3, 4, etc. resource block sets. In some instances, the DCI transmitted by the BS is in DCI format 0_0.

At block 1320, the BS receives an uplink communication from the UE over one or more resource block sets based on the DCI transmitted at 1310. In some instances, the BS receives the uplink communication over a resource block set that includes a starting resource element group of the DCI. In some instances, the BS receives the uplink communication over a resource block set that includes a last resource element group of the DCI. In some instances, the BS receives the uplink communication using the interlace allocation as indicated in the DCI over a plurality of resource block sets, where each resource block set of the plurality of resource block sets includes at least one resource element group of the DCI. Regardless of which resource block set(s) the uplink communication is received over, the uplink communication can be received based on the interlace allocation indicated in the DCI. In some instances, the BS receives the uplink communication as a physical uplink shared channel (PUSCH) communication.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment, the method comprising:
    monitoring, in a search space of a shared radio frequency band, for downlink control information (DCI);
    receiving, from a base station based on the monitoring, the DCI, wherein the DCI includes an explicit interlace allocation but does not include an explicit resource block set allocation;
    determining, based on the received DCI, one or more resource block sets for transmitting an uplink communication; and
    transmitting, to the base station, the uplink communication using the one or more resource block sets and the explicit interlace allocation.

2. The method of claim 1, wherein:
    the determining the one or more resource block sets includes identifying a first resource block set that includes a starting resource element group of the DCI; and
    the transmitting the uplink communication includes transmitting the uplink communication using the first resource block set.

3. The method of claim 1, wherein:
    the determining the one or more resource block sets includes identifying a first resource block set that includes a last resource element group of the DCI; and
    the transmitting the uplink communication includes transmitting the uplink communication using the first resource block set.

4. The method of claim 1, wherein:
    the determining the one or more resource block sets includes identifying a plurality of resource block sets, where each resource block set of the plurality of resource block sets includes at least one resource element group of the DCI; and
    the transmitting the uplink communication includes transmitting the uplink communication using the plurality of resource block sets.

5. The method of claim 1, wherein the receiving the DCI includes receiving all resource element groups of the DCI within a single resource block set.

6. The method of claim 1, wherein the receiving the DCI includes receiving at least a first resource element group of the DCI within a first resource block set and receiving at least a second resource element group of the DCI within a second resource block set, the second resource block set being different than the first resource block set.

7. The method of claim 1, wherein the monitoring for the DCI includes monitoring for the DCI in a common search space of a physical downlink control channel (PDCCH).

8. The method of claim 1, wherein the monitoring for the DCI includes monitoring for the DCI in a user-equipment specific search space of a physical downlink control channel (PDCCH).

9. The method of claim 1, wherein the receiving the DCI includes receiving the DCI in DCI format 0_0.

10. The method of claim 1, wherein the transmitting the uplink communication includes transmitting a physical uplink shared channel (PUSCH) communication.

11. A method of wireless communication performed by a base station, the method comprising:
    transmitting, to a user equipment in a search space, downlink control information (DCI), wherein the DCI includes an explicit interlace allocation but does not include an explicit resource block set allocation; and
    receiving, from the user equipment, an uplink communication over one or more resource block sets based on the DCI.

12. The method of claim 11, wherein the receiving the uplink communication includes:
    receiving the uplink communication over a first resource block set that includes a starting resource element group of the DCI.

13. The method of claim 11, wherein the receiving the uplink communication includes:
    receiving the uplink communication over a first resource block set that includes a last resource element group of the DCI.

14. The method of claim 11, wherein the receiving the uplink communication includes:
    receiving the uplink communication over a plurality of resource block sets, where each resource block set of the plurality of resource block sets includes at least one resource element group of the DCI.

15. The method of claim 11, wherein the transmitting the DCI includes transmitting all resource element groups of the DCI within a single resource block set.

16. The method of claim 11, wherein the transmitting the DCI includes transmitting at least a first resource element group of the DCI within a first resource block set and transmitting at least a second resource element group of the DCI within a second resource block set, the second resource block set being different than the first resource block set.

17. The method of claim 11, wherein the transmitting the DCI includes transmitting the DCI in a common search space of a physical downlink control channel (PDCCH).

18. The method of claim 11, wherein the transmitting the DCI includes transmitting the DCI in a user-equipment specific search space of a physical downlink control channel (PDCCH).

19. The method of claim 11, wherein the transmitting the DCI includes transmitting the DCI in DCI format 0_0.

20. The method of claim 11, wherein the receiving the uplink communication includes receiving a physical uplink shared channel (PUSCH) communication.

21. A user equipment, comprising:
means for monitoring, in a search space of a shared radio frequency band, for downlink control information (DCI);
means for receiving, from a base station based on the monitoring, the DCI, wherein the DCI includes an explicit interlace allocation but does not include an explicit resource block set allocation;
means for determining, based on the received DCI, one or more resource block sets for transmitting an uplink communication; and
means for transmitting, to the base station, the uplink communication using the one or more resource block sets and the explicit interlace allocation.

22. The user equipment of claim 21, wherein:
the means for determining the one or more resource block sets includes means for identifying a first resource block set that includes a starting resource element group of the DCI; and
the means for transmitting the uplink communication includes means for transmitting the uplink communication using the first resource block set.

23. The user equipment of claim 21, wherein:
the means for determining the one or more resource block sets includes means for identifying a first resource block set that includes a last resource element group of the DCI; and
the means for transmitting the uplink communication includes means for transmitting the uplink communication using the first resource block set.

24. The user equipment of claim 21, wherein:
the means for determining the one or more resource block sets includes means for identifying a plurality of resource block sets, where each resource block set of the plurality of resource block sets includes at least one resource element group of the DCI; and
the means for transmitting the uplink communication includes means for transmitting the uplink communication using the plurality of resource block sets.

25. The user equipment of claim 21, wherein the means for receiving the DCI includes means for receiving all resource element groups of the DCI within a single resource block set.

26. The user equipment of claim 21, wherein the means for receiving the DCI includes:
means for receiving at least a first resource element group of the DCI within a first resource block set; and
means for receiving at least a second resource element group of the DCI within a second resource block set, the second resource block set being different than the first resource block set.

27. The user equipment of claim 21, wherein the means for monitoring for the DCI includes means for monitoring for the DCI in a common search space of a physical downlink control channel (PDCCH).

28. The user equipment of claim 21, wherein the means for monitoring for the DCI includes means for monitoring for the DCI in a user-equipment specific search space of a physical downlink control channel (PDCCH).

29. The user equipment of claim 21, wherein the means for receiving the DCI includes means for receiving the DCI in DCI format 0_0.

30. The user equipment of claim 21, wherein the means for transmitting the uplink communication includes means for transmitting a physical uplink shared channel (PUSCH) communication.

31. A base station, comprising:
means for transmitting, to a user equipment in a search space, downlink control information (DCI), wherein the DCI includes an explicit interlace allocation but does not include an explicit resource block set allocation; and
means for receiving, from the user equipment, an uplink communication over one or more resource block sets based on the DCI.

32. The base station of claim 31, wherein the means for receiving the uplink communication includes:
means for receiving the uplink communication over a first resource block set that includes a starting resource element group of the DCI.

33. The base station of claim 31, wherein the means for receiving the uplink communication includes:
means for receiving the uplink communication over a first resource block set that includes a last resource element group of the DCI.

34. The base station of claim 31, wherein the means for receiving the uplink communication includes:
means for receiving the uplink communication over a plurality of resource block sets, where each resource block set of the plurality of resource block sets includes at least one resource element group of the DCI.

35. The base station of claim 31, wherein the means for transmitting the DCI includes means for transmitting all resource element groups of the DCI within a single resource block set.

* * * * *